United States Patent
Nybäck et al.

(10) Patent No.: US 11,203,994 B2
(45) Date of Patent: Dec. 21, 2021

(54) METHOD AND CONTROL DEVICE FOR DETERMINING RELIABILITY REGARDING MISFIRE DETERMINATION OF CYLINDERS OF AN INTERNAL COMBUSTION ENGINE

(71) Applicant: Scania CV AB, Södertälje (SE)

(72) Inventors: Björn Nybäck, Rönninge (SE); Ola Stenlåås, Hägersten (SE); Oskar Kleback, Bandhagen (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/253,880

(22) PCT Filed: Jun. 14, 2019

(86) PCT No.: PCT/SE2019/050562
§ 371 (c)(1),
(2) Date: Dec. 18, 2020

(87) PCT Pub. No.: WO2020/005134
PCT Pub. Date: Jan. 2, 2020

(65) Prior Publication Data
US 2021/0270199 A1    Sep. 2, 2021

(30) Foreign Application Priority Data
Jun. 25, 2018  (SE) .................................... 1850782-2

(51) Int. Cl.
*F02D 41/14* (2006.01)
*G01M 15/11* (2006.01)
(Continued)

(52) U.S. Cl.
CPC ....... *F02D 41/1448* (2013.01); *F02D 41/009* (2013.01); *G01L 23/24* (2013.01);
(Continued)

(58) Field of Classification Search
CPC ............... F02D 41/009; F02D 41/1448; F02D 2200/1015; F02D 2250/14; G01M 15/106; G01M 15/11; G01L 23/24; G01L 23/30
(Continued)

(56) References Cited

U.S. PATENT DOCUMENTS 5,044,195 A * 9/1991 James ................. F02D 41/1497
                                                    73/114.05
5,109,825 A * 5/1992 Joos ......................... F02P 11/06
                                                    123/479
(Continued)

FOREIGN PATENT DOCUMENTS

DE    102015221447 A1 *  5/2017 ............ F02B 77/086
GB         2343001 A     4/2000

OTHER PUBLICATIONS

Scania CV AB, International Application No. PCT/SE2019/050562, International Search Report, dated Aug. 27, 2019.
(Continued)

*Primary Examiner* — John M Zaleskas
(74) *Attorney, Agent, or Firm* — Moore & Van Allen PLLC; W. Kevin Ransom

(57) ABSTRACT

Disclosed is a method for determining reliability regarding misfire determination of cylinders of an engine, comprising detecting a pressure in an exhaust manifold for a set of operation parameters comprising a certain range of crank angles for a certain engine load and certain engine speed so as to, for an actual cylinder setup of the engine, create pressure sample value patterns for combustion and misfire conditions. A template course is created for the thus created pressure sample value patterns comprising a set of sample points. The pressure for the created template courses is normalized at a desired crank angle. Difference values are determined based upon differences between sample points (Continued)

and corresponding detected and the normalized pressure values. The determined difference values are summarized so as to determine whether a predetermined share of the summarized difference values lies above or below a predetermined threshold value indicating reliability regarding misfire determination.

22 Claims, 6 Drawing Sheets

(51) Int. Cl.
*F02D 41/00* (2006.01)
*G01L 23/30* (2006.01)
*G01L 23/24* (2006.01)

(52) U.S. Cl.
CPC ............ *G01L 23/30* (2013.01); *G01M 15/11* (2013.01); *F02D 2200/1015* (2013.01)

(58) Field of Classification Search
USPC ......................................... 73/114.02, 114.06
See application file for complete search history.

(56) References Cited

U.S. PATENT DOCUMENTS

| | | | | |
|---|---|---|---|---|
| 5,528,930 A * | 6/1996 | Park | ...................... | G01M 15/09 73/114.06 |
| 5,758,307 A * | 5/1998 | Haefner | ................ | G01M 15/08 701/101 |
| 5,819,197 A * | 10/1998 | Fiaschetti | .............. | G01M 15/11 701/110 |
| 5,848,372 A * | 12/1998 | Ito | ........................... | G01M 15/11 701/111 |
| 5,862,507 A * | 1/1999 | Wu | ...................... | F02D 41/1498 701/111 |
| 5,935,189 A * | 8/1999 | Park | ...................... | G01M 15/11 701/111 |
| 6,243,641 B1 * | 6/2001 | Andrews | ................ | G01M 15/08 123/436 |
| 6,651,490 B1 * | 11/2003 | Ceccarani | ............ | F02D 41/1448 73/114.74 |
| 6,978,666 B1 * | 12/2005 | Wu | ........................ | G01M 15/11 73/114.02 |
| 7,801,671 B1 * | 9/2010 | Pederson | ................ | G01M 15/11 701/111 |
| 2006/0207526 A1 * | 9/2006 | Kassner | ................. | F02P 5/1514 123/1 R |
| 2013/0340512 A1 * | 12/2013 | Horlbeck | ............ | F02D 41/1497 73/114.02 |
| 2014/0200852 A1 * | 7/2014 | Kappaganthu | ......... | G01M 15/11 702/183 |
| 2014/0297157 A1 * | 10/2014 | Horlbeck | ............ | F02D 41/1497 701/102 |
| 2018/0058358 A1 * | 3/2018 | Guo | .................... | F02D 41/1498 |

OTHER PUBLICATIONS

Scania CV AB, International Application No. PCT/SE2019/050562, Written Opinion, dated Aug. 27, 2019.
Scania CV AB, International Application No. PCT/SE2019/050562, International Preliminary Report on Patentability, dated Dec. 29, 2020.

* cited by examiner

METHOD AND CONTROL DEVICE FOR DETERMINING RELIABILITY REGARDING MISFIRE DETERMINATION OF CYLINDERS OF AN INTERNAL COMBUSTION ENGINE

CROSS-REFERENCE TO RELATED APPLICATIONS

This application is a National Stage Application (filed under 35 § U.S.C. 371) of PCT/SE2019/050562, filed Jun. 14, 2019 of the same title, which, in turn claims priority to Swedish Application No. 1850782-2 filed Jun. 25, 2018 of the same title; the contents of each of which are hereby incorporated by reference.

FIELD OF THE INVENTION

The invention relates to a method performed by a control device for determining reliability regarding misfire determination of cylinders of an internal combustion engine. The invention also relates to a control device for determining reliability regarding misfire determination of cylinders of an internal combustion engine. The invention in addition relates to a computer program and a computer readable medium.

BACKGROUND OF THE INVENTION

Vehicles such as heavy duty vehicles in the shape of trucks may be operated by internal combustion engines. A problem that can occur with internal combustion engines is misfire in one or more cylinders of the combustion engine. A misfire may be due to failure to inject fuel in a cylinder or when you inject fuel but do not get a combustion. A problem with misfire in an internal combustion engine due to non-combustion of injected fuel is that the fuel may destroy exhaust gas treatment components leading to high emissions. There are also legislations with regard to engine misfire detection.

There are various methods of detecting misfire. One method that is used to detect misfire is a crank angle based method that detects irregularities in engine speed in connection to misfire. There are also methods based upon exhaust pressure that is dependent on correct measured absolute pressure level.

The demands for more accurate determination of engine misfire are increasing.

There is thus a need to provide more accurate methods for engine misfire determination and thus improve reliability regarding misfire determination of cylinders of an internal combustion engine.

SUMMARY OF THE INVENTION

An object of the present invention is to provide a method performed by a control device for determining reliability regarding misfire determination of cylinders of an internal combustion engine.

Another object of the present invention is to provide a control device for determining reliability regarding misfire determination of cylinders of an internal combustion engine.

Another object of the present invention is to provide a vehicle comprising such a control device.

These and other objects, apparent from the following description, are achieved by a method, a control device, a vehicle, a computer program and a computer readable medium, as set out in the appended independent claims.

Preferred embodiments of the method and the control device are defined in appended dependent claims.

Specifically an object of the invention is achieved by a method performed by a control device for determining reliability regarding misfire determination of cylinders of an internal combustion engine. The method comprises the step of, for calibration, detecting the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for combustion conditions and a sample value pattern for misfire conditions. The method further comprises the steps of, for calibration: creating a template course for the thus created pressure sample value patterns, said template course comprising a set of sample points; normalizing the pressure for the created template courses at a desired crank angle; and storing normalized thus created template courses. The method also comprises the steps of: determining difference values based upon difference between sample points and corresponding detected and normalized pressure values within in a desired range of crank angles; and summarizing the thus determined difference values so as to determine whether a predetermined share of the summarized difference values lies above or below a predetermined threshold value so as to determine reliability regarding misfire determination.

Hereby the reliability regarding misfire determination of cylinders of an internal combustion engine may be improved. This facilitates correctly determining misfires even at high vehicles speeds and low vehicle loads. By thus normalizing the pressure the accuracy in the determination is increased in that sensor off-set error may be cancelled out so that diagnostics gets more robust. By thus normalizing the pressure errors in measured absolute pressure are cancelled out.

According to an embodiment of the method the thus created template course is based on average values of the thus created pressure sample value patterns. This further increases the accuracy.

According to an embodiment of the method the step of normalizing the pressure for the created template courses at a desired crank angle comprises the step of choosing a crank angle associated with a low derivative of a template course. This further increases the accuracy in that a certain deviation of chosen crank angle will not affect the result.

According to an embodiment of the method the step of normalizing the pressure for the created template courses at a desired crank angle comprises the step of choosing a crank angle resulting in a satisfactory divergence of those template courses from that crank angle. This further increases the accuracy in that it facilitates choosing sample points in a range of crank angle degrees where there is a significant divergence of those template courses.

According to an embodiment the method comprises the steps of, prior to determining difference values, during engine operation: detecting the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for engine operation; and normalizing the pressure for the created pressure sample value pattern at the desired crank angle so as to provide the detected and normalized pressure values for the determination of difference values.

According to an embodiment of the method the step of determining difference values based upon difference between sample points and corresponding detected and normalized pressure values comprises performing a subtraction between the sample points and corresponding pressure values and/or providing a ratio of the sample points and corresponding pressure values.

According to an embodiment the method comprises the step of, prior to summarizing the thus determined difference values, squaring the thus determined difference values. This further increases the accuracy.

According to an embodiment of the method the step of determining difference values based upon difference between sample points and corresponding detected pressure values comprises the step of performing the determination within a range of crank angles where the template courses have diverged to a certain extent. This further increases the accuracy.

According to an embodiment of the method the set of operation parameters for which the step of detecting the pressure in the exhaust manifold arrangement of the internal combustion engine is performed further comprises certain engine cylinder valve activation timings and/or certain engine cylinder valve lift rates. This further increases the accuracy in that, for engines with intake valves and exhaust valves with variable valve times, possible affected pressure in exhaust manifold arrangement due to such variations may be considered. This further increases the accuracy in that, for engines with intake valves and exhaust valves with variable valve lifts, possible affected pressure in exhaust manifold arrangement due to such variations may be considered.

According to an embodiment the method comprises the step of, if it is determined, based upon summarizing the thus determined difference values, that, at a certain engine speed, misfire has been determined without reliability, providing a gear shift so as to decrease the engine speed for providing a new reliability determination with regard to misfire. Hereby a misfire that has been determined with unsatisfactory reliability may be determined with satisfactory reliability in an efficient way.

A control device for determining reliability regarding misfire determination of cylinders of an internal combustion engine. The control device is configured to, for calibration, detect the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for combustion conditions and a sample value pattern for misfire conditions. The control device if further configured to, for calibration: create a template course for the thus created pressure sample value patterns, said template course comprising a set of sample points; normalize the pressure for the created template courses at a desired crank angle; and store normalized thus created template courses. The control device if further configured to determine difference values based upon difference between sample points and corresponding detected and normalized pressure values within in a desired range of crank angles; and summarize the thus determined difference values so as to determine whether a predetermined share of the summarized difference values lies above or below a predetermined threshold value so as to determine reliability regarding misfire determination.

According to an embodiment of the control device the thus created template course is based on average values of the thus created pressure sample value patterns.

According to an embodiment the control device, when normalizing the pressure for the created template courses at a desired crank angle, is configured to choose a crank angle associated with a low derivative of a template course.

According to an embodiment the control device, when normalizing the pressure for the created template courses at a desired crank angle, is configured to choose a crank angle resulting in a satisfactory divergence of those template courses from that crank angle.

According to an embodiment the control device is configured to, prior to determining difference values, during engine operation: detect the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for engine operation; and normalize the pressure for the created pressure sample value pattern at the desired crank angle so as to provide the detected and normalized pressure values for the determination of difference values.

According to an embodiment the control device, when determining difference values based upon difference between sample points and corresponding detected and normalized pressure values is configured to perform a subtraction between the sample points and corresponding pressure values and/or configured to provide a ratio of the sample points and corresponding pressure values.

According to an embodiment the control device is configured to, prior to summarizing the thus determined difference values, square the thus determined difference values.

According to an embodiment the control device, when determining difference values based upon difference between sample points and corresponding detected pressure values, is configured to perform the determination within a range of crank angles where the template courses have diverged to a certain extent.

According to an embodiment of the control device the set of operation parameters for which the control device is configured to detect the pressure in the exhaust manifold arrangement of the internal combustion engine further comprises certain engine cylinder valve activation timings and/or certain engine cylinder valve lift rates According to an embodiment the control device is configured to, if it is determined, based upon summarizing the thus determined difference values, that, at a certain engine speed, misfire has been determined without reliability, provide a gear shift so as to decrease the engine speed for providing a new reliability determination with regard to misfire.

Specifically an object of the invention is achieved by a vehicle operated by an internal combustion engine, the vehicle comprising a control device as set out herein.

Specifically an object of the invention is achieved by a computer program for determining reliability regarding misfire determination of cylinders of an internal combustion engine, said computer program comprising program code which, when run on an control device or another computer connected to the control device, causes the control device to perform the method as set out herein.

Specifically an object of the invention is achieved by a computer readable medium comprising instructions which, when executed by a computer, cause the computer to carry out the method as set out herein.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION OF THE INVENTION

Hereinafter the term "link" refers to a communication link which may be a physical connector, such as an optoelectronic communication wire, or a non-physical connector such as a wireless connection, for example a radio or microwave link.

Figure 1:
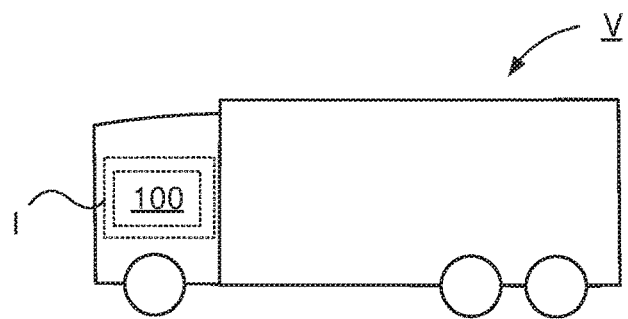
FIG. 1 schematically illustrates a side view of a vehicle according to an embodiment of the present invention.

FIG. 1 schematically illustrates a side view of a vehicle V according to an embodiment of the present invention.

The exemplified vehicle V is a is a heavy vehicle in the shape of a truck. The exemplified vehicle is operated by means of an internal combustion engine. The exemplified vehicle may be a hybrid vehicle. The exemplified vehicle may be an autonomous vehicle. The vehicle according to the present disclosure could be any vehicle operated by means of an internal combustion engine.

The vehicle V may comprise a control device for determining reliability regarding misfire determination of cylinders of an internal combustion engine. The vehicle V comprises, according to an embodiment, a control device 100 for determining reliability regarding misfire determination of cylinders of an internal combustion engine according to FIG. 3.

Figure 4:
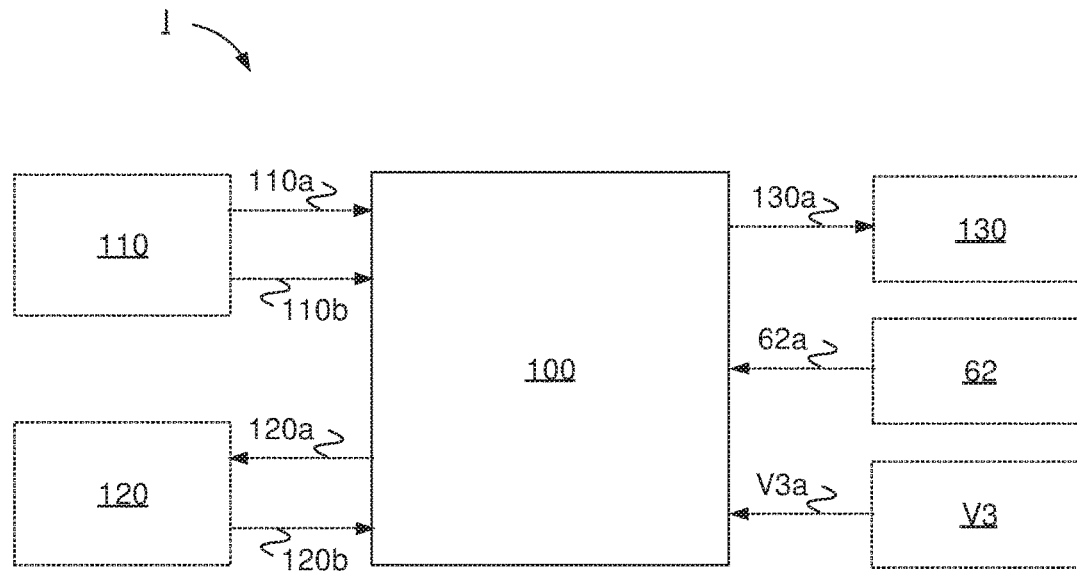
FIG. 4 schematically illustrates a block diagram of a control device for determining reliability regarding misfire determination of cylinders of an internal combustion engine according to an embodiment of the present disclosure.

The vehicle V is, according to an embodiment, arranged to be operated in accordance with a method M1 for determining reliability regarding misfire determination of cylinders of an internal combustion engine according to FIG. 4.

Figure 2:
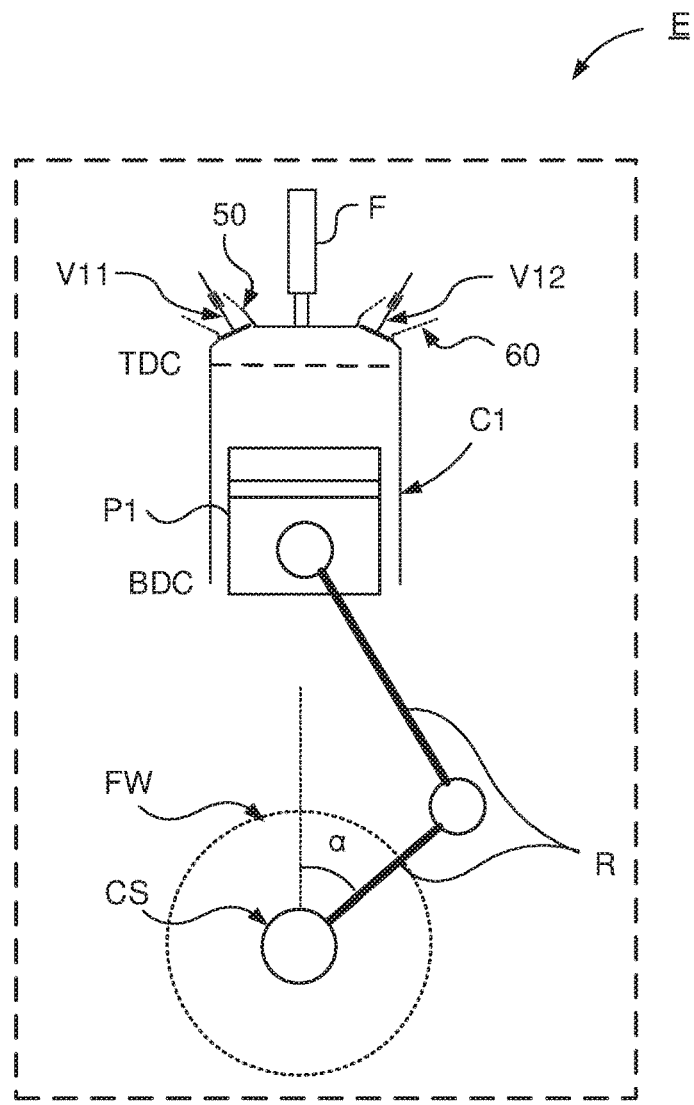
FIG. 2 schematically illustrates an internal combustion engine according to an embodiment of the present disclosure.

FIG. 2 schematically illustrates the internal combustions engine E according to an embodiment of the present disclosure.

The engine E comprises a crankshaft CS connected to a flywheel FW, and a set of cylinders of which one cylinder C1 is shown, distributed along said crankshaft CS for rotating said crankshaft CS during operation of the engine.

The cylinder C1 is connected to the crankshaft via a connecting rod R connected to a piston P1 of the cylinder C1. Each cylinder of the set of cylinders is arranged to house a piston of which the piston P1 for the cylinder C1 is shown. The piston P1 is movably arranged within the cylinder C1 for performing strokes as explained below.

The engine E comprises fuel injectors F for injecting fuel into the cylinder C for combustion.

The engine E is arranged to provide a four stroke cycle. The complete four stroke cycle forms a single thermodynamic cycle from which mechanical work will be extracted for operating a vehicle. For a complete four stroke cycle the crankshaft will turn two revolutions, this being the engine cycle.

When the piston P is farthest from the crankshaft CS is known as the top dead centre TDC and when the piston P is closest to the crankshaft CS is known as the bottom dead centre BDC. A dead centre is when the connecting rod R and the crankshaft CS align.

The strokes comprise an intake stroke (TDC to BDC) filling the cylinder C with air, a compression stroke (BDC to TDC) where the air is compressed and at the end of which fuel is injected for combustion, an expansion stroke (TDC to BDC) where the combustion is completed and an exhaust stroke (BDC to TDC).

The crankshaft angle α may according to a variant determined by means of a sensor unit arranged in connection to the flywheel FW.

The engine comprises an intake manifold arrangement 50 for providing compressed air to the cylinders of the engine. In FIG. 2 a portion of the intake manifold arrangement 50 leading to the first cylinder C1 is shown. The intake manifold arrangement 50 is described in more detail below with reference to FIG. 3.

The engine comprises an exhaust manifold arrangement 60 for providing exhaust gas from the cylinders of the engine to the exhaust pipe. In FIG. 2 a portion of the exhaust manifold arrangement 60 leading from the first cylinder C1 is shown. The exhaust manifold arrangement 60 is described in more detail below with reference to FIG. 3.

The engine E comprises an intake valve for each cylinder for allowing compressed air into the respective cylinder in the intake stroke. Here the intake valve V11 for the first cylinder C1 of the engine E is shown. The respective intake valve is arranged in the intake manifold arrangement 50 of which a portion The engine E further comprises exhaust valve for each cylinder for allowing exhaust gas out of the cylinder in the exhaust stroke.

According to an embodiment the engine according to the present disclosure is an engine with intake valves and exhaust valves with variable valve times, i.e. when in time the intake valves and exhaust valves open and close. This may affect the pressure in the exhaust manifold arrangement.

According to an embodiment the engine according to the present disclosure is an engine with intake valves and exhaust valves with variable valve lifts, i.e. to what extent, i.e. degree, the intake valves and exhaust valves are opened or closed. This may affect the pressure in the exhaust manifold arrangement.

The engine E may be an engine using Exhaust Gas Recirculation in one or more points of operation.

Figure 3:
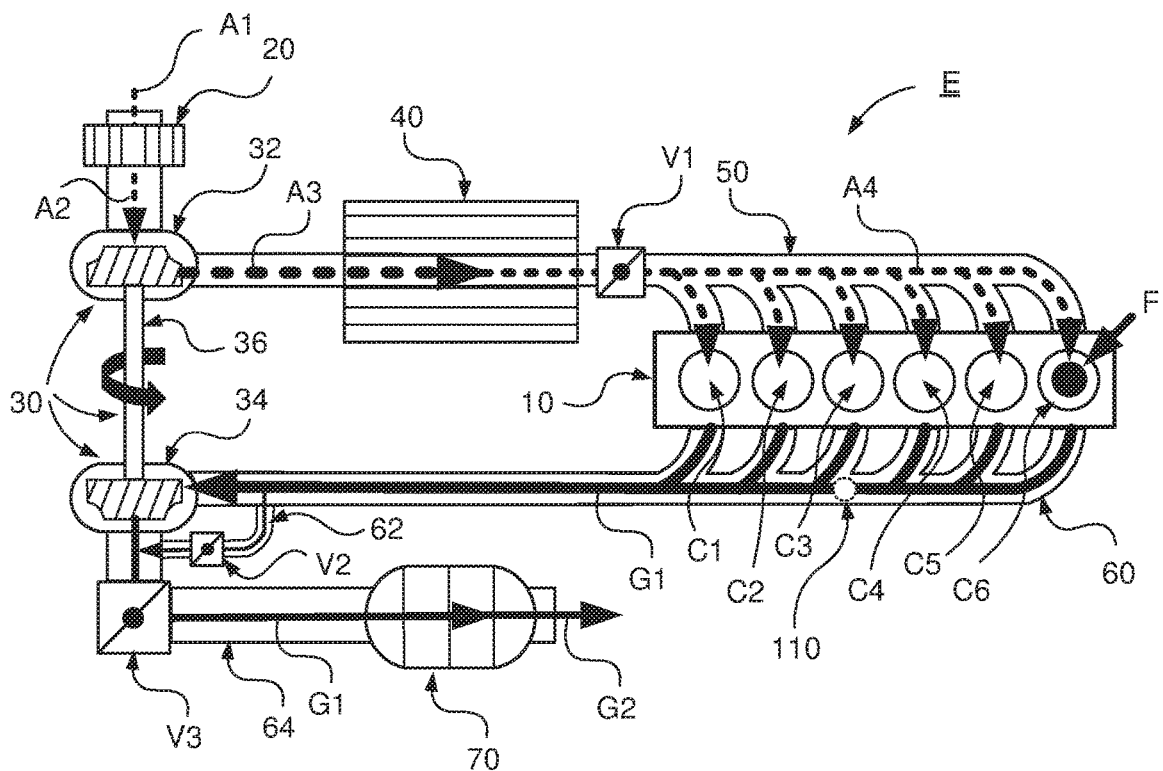
FIG. 3 schematically illustrates the internal combustion engine in FIG. 2 according to an embodiment of the present disclosure.

FIG. 3 schematically illustrates an internal combustion engine E in FIG. 2 according to an embodiment of the present disclosure.

The engine E in FIG. 3 is shown during engine operation illustrating the gas flow during engine operation.

The engine E according to schematically illustrated in FIG. 3 is a turbocharged diesel engine. In this example an engine E with six cylinders C1, C2, C3, C4, C5, C6 is shown. The engine E comprises an engine block 10 for housing the cylinders and other engine operation components.

The engine E is arranged to provide a four stroke cycle. The complete four stroke cycle forms a single thermodynamic cycle from which mechanical work will be extracted for operating a vehicle.

The strokes comprise an intake stroke filling the respective cylinder C1-C6 with air, a compression stroke where the air is compressed and at the end of which fuel is injected for combustion, here illustrated with injection of fuel F into cylinder C6, an expansion stroke where the combustion is completed and an exhaust stroke.

The engine E further comprises an air filter 20 through which ambient air A1 is arranged to pass so that filtered air A2 is obtained.

The engine E comprises a turbocharger 30 having a compressor 32, a turbine 34 and a shaft 36 operably connecting the compressor 32 and turbine 36. The compressor 32 is arranged to compress the filtered air A2 so that compressed air A3 is obtained.

The engine E comprises an intercooler 40 for cooling the compressed air A3 such that cooled compressed air A4 is obtained.

The engine E comprises an intake manifold arranged 50 for distributing the air, i.e. the compressed air A4 to the cylinders C1-C6.

The engine E may comprise a throttle valve V1 arranged to control the distribution of air A4 to the cylinders C1-C6.

The engine E comprises an exhaust manifold arrangement 60 for distributing exhaust gas G1 from the cylinders C1-C6 to the turbine 34, the exhaust gas being arranged to pass the turbine 34 for operating the turbocharger 30 such that the compressor 32 compresses the filtered air A2.

The exhaust manifold 60 may comprise a waste gate 62 for allowing exhaust gas to bypass the turbine 34 and further to the exhaust pipe 64. The engine E, when having a waste gate 62, comprises a valve V2 arranged to control the distribution of exhaust gas through the waste gate 62.

The engine E may comprise an exhaust gas brake V3 arranged downstream of the turbine 34 and downstream of the waste gate 62. When activated, the exhaust gas brake V3 is configured to provide an exhaust back pressure by rendering exhaust gas flow through the exhaust pipe 64 more difficult. The exhaust back pressure is used for braking the engine speed. The exhaust back pressure thus created increases engine temperature due to the thus increased load. The exhaust back pressure may be used for increasing engine temperature and exhaust gas temperature, this being used at low engine speeds as the exhaust gases at low engine speeds do not reach high enough temperatures in order for the exhaust treatment to function efficiently. The exhaust gas brake V3 comprises a valve configuration for controlling the exhaust gas flow through the exhaust pipe 64.

The engine E comprises an exhaust treatment system 70 arranged to treat the exhaust gas in order to reduce emissions so that treated exhaust gases G2 exits the exhaust gas pipe 64.

FIG. 3 thus illustrates the gas flow through the engine E. Ambient air A1 enters through the air filter 20, is compressed in the compressor 32 and led through the intercooler 40 to the intake manifold arrangement 50 before entering the cylinders 1-6. Fuel F is added by injection into the cylinders and after combustion, the exhaust gas G1 pass through the turbine 34 to the exhaust treatment system 70.

The present invention relates to determining reliability regarding misfire determination of cylinders of an internal combustion engine, as described with reference to FIGS. 4, 5, 6a-b and 7. When determining reliability regarding misfire determination of cylinders of an internal combustion engine the pressure in the exhaust manifold arrangement 60 of the internal combustion engine E is detected for a certain range of crank angles for a certain engine load and certain engine speed so as to, for the actual cylinder setup of the engine, create a pressure sample value pattern for combustion conditions and a sample value pattern for misfire conditions.

The pressure in the exhaust manifold arrangement 60 may be detected by means of a pressure sensor arrangement 110 comprising one or more pressure sensors arranged in connection to the exhaust manifold arrangement 60.

The exhaust manifold arrangement 60 schematically illustrated in FIG. 3 has one bank for all six branches connected to the respective cylinder C1, C2, C3, C4, C5, C6. The exhaust manifold arrangement according to the present disclosure may have any configuration. For a six cylinder engine the exhaust manifold arrangement according to the present disclosure may have two banks, each bank having three branches connected to three of the cylinders of the six cylinder engine.

According to an embodiment, when detecting the pressure in the exhaust manifold arrangement according to the present disclosure, at least one pressure sensor for each bank of the exhaust manifold arrangement is used.

In FIG. 3 the gas flow through a turbocharged diesel engine E is shown. The invention is equally applicable to any internal combustion engine.

The engine according to the present disclosure could be any suitable internal combustion engine with any suitable number of cylinders. The internal combustion engine according to the present invention could for example be a 5-cylinder engine, a 6-cylinder engine or an 8-cylinder engine. The cylinders could be in any suitable alignment, for example inline engine or a V-engine.

FIG. 4 schematically illustrates a block diagram of a control device 100 for determining reliability regarding misfire determination of cylinders of an internal combustion engine according to an embodiment of the present disclosure.

The control device 100 for determining reliability regarding misfire determination of cylinders of an internal combustion engine may be comprised in a system I for determining reliability regarding misfire determination of cylinders of an internal combustion engine.

The control device may be implemented as a separate entity or distributed in two or more physical entities. The control device may comprise one or more computers. The control device may thus be implemented or realized by the control device comprising a processor and a memory, the memory comprising instructions, which when executed by the processor causes the control device to perform the herein disclosed method.

The control device 100 may comprise one or more electronic control units, processing units, computers, server units or the like for determining reliability regarding misfire determination of cylinders of an internal combustion engine. The control device 100 may comprise control device such as one or more electronic control units arranged on board a vehicle. The control device 100 may comprise one or more electronic control units, processing units, computers, server units or the like of an off-board system arranged externally to a vehicle, such a control device 100 or parts of the control device according to an embodiment being operably connectable to the vehicle. The control device 100 may comprise one or more electronic control units, processing units, computers, server units or the like configured for calibration part of the determining reliability regarding misfire determination of cylinders of an internal combustion engine. The control device 100 may comprise one or more electronic control units, processing units, computers, server units or the like configured for engine operation part, e.g. vehicle operation part, of the determining reliability regarding misfire determination of cylinders of an internal combustion engine. The control device 100 may comprise one or more electronic control units, processing units, computers, server units or the like configured for, vehicle operation part being arranged on-board the vehicle.

Figure 6A:
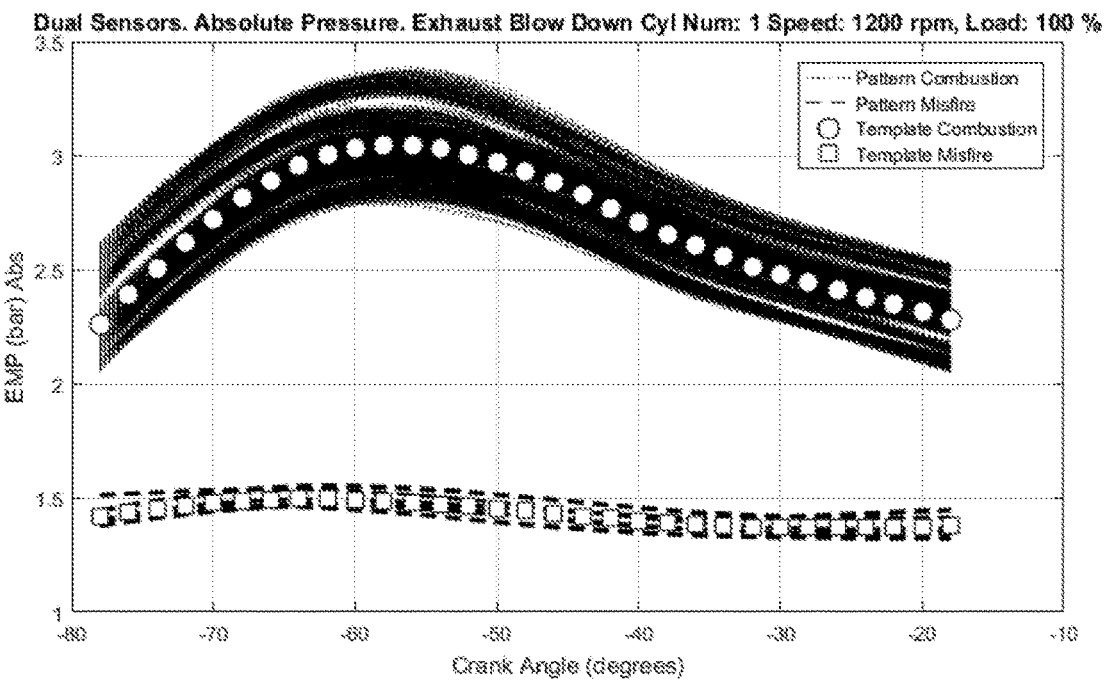
FIG. 6a schematically illustrates a graph of sample value patterns for combustion conditions and misfire conditions for a certain range of crank angles for a certain engine load and certain engine speed according to an embodiment of the present disclosure.
Figure 6B:
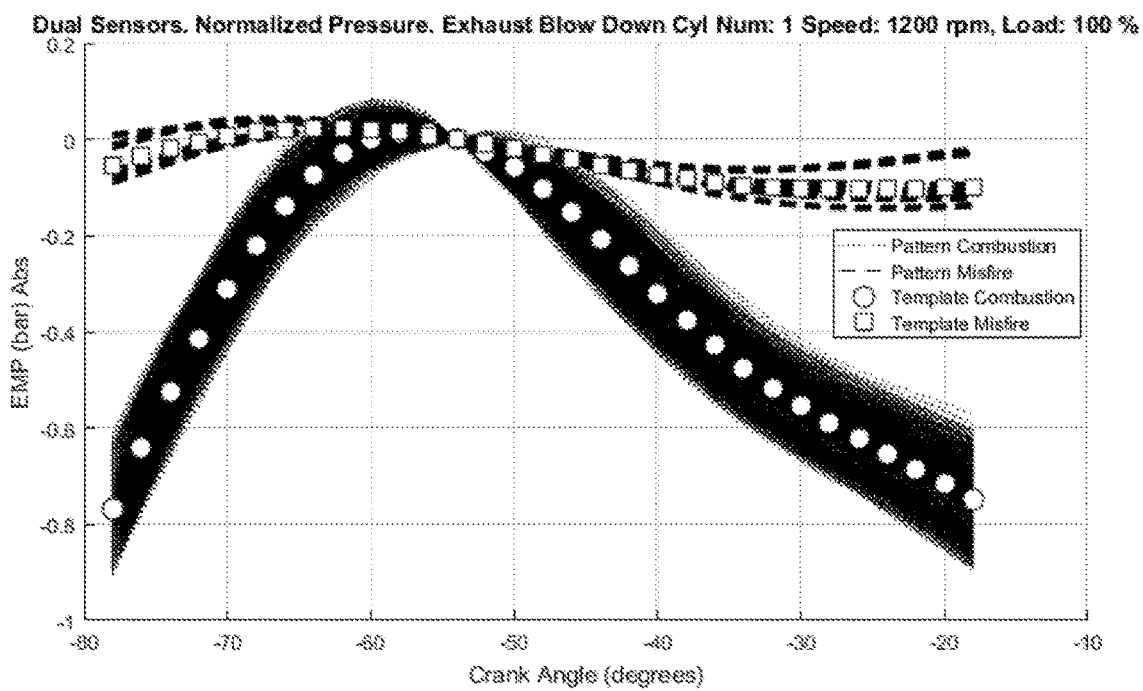
FIG. 6b schematically illustrates a graph of the sample value patterns in FIG. 6a where the pressure for template courses for the sample value patterns has been normalized at a desired crank angle degree according to an embodiment of the present disclosure.

The control device 100 is configured to, for calibration, detect the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for combustion conditions and a sample value pattern for misfire conditions. An example of such sample value patterns for combustion conditions and misfire conditions is schematically illustrated in FIG. 6a-b.

According to an embodiment the set of operation parameters for which the control device 100 is configured to detect the pressure in the exhaust manifold arrangement of the internal combustion engine further comprises certain engine cylinder valve activation timings and/or certain engine cylinder valve lift rates.

Thus, if the engine according to the present disclosure is an engine with intake valves and exhaust valves with variable valve times, the set of operation parameters for which the control device 100 is configured to detect the pressure in the exhaust manifold arrangement of the internal combustion engine further comprises certain engine cylinder valve activation timings.

Thus, if the engine according to the present disclosure is an engine with intake valves and exhaust valves with variable valve lifts the set of operation parameters for which the control device 100 is configured to detect the pressure in the exhaust manifold arrangement of the internal combustion engine further comprises certain engine cylinder valve lift rates.

The pressure in the exhaust manifold arrangement is configured to be detected by means of a pressure sensor arrangement 110 arranged in connection to the exhaust manifold arrangement. The pressure sensor arrangement 110 may comprise one or more pressure sensors. The pressure sensor arrangement 110 may comprise one or more pressure sensors used for detecting pressure in the exhaust manifold arrangement for calibration. The pressure sensor arrangement 110 may comprise one or more pressure sensors used for detecting pressure in the exhaust manifold arrangement during non-calibration, e.g. during engine operation, e.g. during vehicle operation. The one or more sensors of the sensor arrangement 110 configured to be used for calibration may be the same as the one or more sensors of the sensor arrangement 110 configured to be used for non-calibration and/or different sensors of the sensor arrangement. The pressure detected by means of the pressure sensor arrangement 110 may be used to determine local exhaust manifold pressure in connection to the respective cylinder by means of utilizing a virtual sensor arrangement. The pressure sensor arrangement 110 is according to an embodiment comprised in the system I for determining reliability regarding misfire determination of cylinders of an internal combustion engine.

According to an embodiment, when detecting the pressure in the exhaust manifold arrangement according to the present disclosure, at least one pressure sensor for each bank of the exhaust manifold arrangement is used. The pressure sensor arrangement 110 may comprise a pressure sensor arranged in the exhaust manifold arrangement in connection to the respective cylinder of the internal combustion engine.

The control device 100 is according to an embodiment operably connected to the pressure sensor arrangement 110. The system I may comprise the pressure sensor arrangement 110.

The pressure sensor arrangement 110 is thus configured to detect the pressure in the exhaust manifold arrangement of the internal combustion engine for a certain range of crank angles for a certain engine load and certain engine speed.

The pressure sensor arrangement 110 is configured to detect the pressure in the exhaust manifold arrangement for a certain range of crank angles for a certain engine load and certain engine speed for a large number of cycles so as to provide pressure values in the exhaust manifold arrangement. The exhaust pressure detection by means of the pressure sensor arrangement 110 is arranged to be repeated for that certain range of crank angles for different engine load and different engine speeds. The exhaust pressure detection by means of the pressure sensor arrangement 110 is arranged to be performed for each cylinder of the internal combustion engine.

The exhaust pressure detection by means of the pressure sensor arrangement 110 is arranged to be performed for each cylinder of the internal combustion engine during combustion conditions for the respective cylinder.

The exhaust pressure detection by means of the pressure sensor arrangement 110 is arranged to be performed for calibration.

The exhaust pressure detection by means of the pressure sensor arrangement 110 is arranged to be performed for each cylinder of the internal combustion engine during misfire conditions for one cylinder. The exhaust pressure detection by means of the pressure sensor arrangement 110 is arranged to be performed so that each cylinder has been in misfire conditions with the rest of the cylinders in combustion conditions.

The control device 100 is configured to, for calibration, for the actual cylinder setup of the engine, create a pressure sample value pattern for combustion conditions and a sample value pattern for misfire conditions based on the thus detected pressure in the exhaust manifold arrangement for a certain range of crank angles for a certain engine load and certain engine speed.

The control device 100 is configured to create such pressure sample value patterns for combustion conditions and sample value patterns for misfire conditions for each cylinder based on thus detected pressure in the exhaust manifold arrangement for a certain range of crank angles for different engine loads and different engine speeds. An example of such created sample value patterns is shown in FIG. 6a.

The exhaust pressure detection by means of the pressure sensor arrangement 110 by means of which the pressure sample value patterns for combustion conditions and the sample value patterns for misfire conditions are created may be performed in a workshop for the cylinder setup of the engine.

The exhaust pressure detection by means of the pressure sensor arrangement 110 by means of which the pressure sample value patterns for combustion conditions and the sample value pattern for misfire conditions are created may be performed during production of the engine.

The control device 100 if further configured to, for calibration, create a template course for the thus created pressure sample value patterns, said template course comprising a set of sample points. The control device 100 if configured to create template courses for the thus created pressure sample value patterns for combustion, each template course for combustion comprising a set of sample points for combustion. The control device 100 if configured to create template courses for the thus created pressure sample value patterns for misfire, each template course for misfire comprising a set of sample points for misfire.

The thus created template course is according to an embodiment based on average values of the thus created pressure sample value patterns. Each created template course is according to an embodiment based on average values of the pressure sample value pattern from which it was created. Each created template course for combustion is according to an embodiment based on average values of the pressure sample value pattern for combustion from which it was created. Each created template course for misfire is according to an embodiment based on average values of the pressure sample value pattern for misfire from which it was created. The control device 100 is according to an embodiment configured to calculate the average values of the thus created pressure sample value patterns. The control device 100 is according to an embodiment configured to calculate the average values of the thus created pressure sample value patterns for the certain range of crank angles. The set of sample points of the template course correspond to the thus determined average values at certain crank angles of the certain range of crank angles.

The control device 100 is configured to create a template course comprising a set of sample points for each created pressure sample value pattern for combustion conditions.

The control device 100 is configured to create a template course comprising a set of sample points for each created pressure sample value pattern for misfire conditions.

An example of such created template courses is shown in FIG. 6a.

The control device 100 is then configured to, for calibration, normalize the pressure for the created template courses at a desired crank angle. The control device 100 is thus configured to normalize the pressure for the created template courses for combustion at a desired crank angle. The control device 100 is thus configured to normalize the pressure for the created template courses for misfire at a desired crank angle. An example of such created pressure normalized template courses is shown in FIG. 6b.

The control device 100, when normalizing the pressure for the created template courses at a desired crank angle, is, according to an embodiment, configured to choose a crank angle associated with a low derivative of a template course. The control device 100 is thus configured to determine low derivatives of the template course in connection to normalizing the pressure for the created template courses at a desired crank angle.

The control device 100, when normalizing the pressure for the created template courses at a desired crank angle, is, according to an embodiment, configured to choose a crank angle resulting in a satisfactory divergence of those template courses from that crank angle. The control device 100 is thus configured to determine crank angle resulting in a satisfactory divergence of those template courses from that crank angle in connection to normalizing the pressure for the created template courses at a desired crank angle.

The control device 100 is, for calibration, configured to store the normalized thus created template courses. The control device 100 is configured to, when storing normalized thus created template courses, store template courses for combustion and/or template courses for misfire.

The system I may comprise a storage device 120 for storing the normalized thus created template courses. The storage device 120 may be any suitable storage device such as an internal storage device arranged in the vehicle and/or an external storage device arranged externally to the vehicle.

The control device 100 may comprise or be operably connectable to the storage device 120 for storing the normalized thus created template courses.

The control device 100 is configured to determine difference values based upon difference between sample points and corresponding detected and normalized pressure values within in a desired range of crank angles. The detected pressure values are configured to be detected by means of a pressure sensor arrangement, e.g. the pressure sensor arrangement 110, for non-calibration, e.g. during engine operation, e.g. during vehicle operation.

The one or more sensors of the sensor arrangement 110 configured to be used for calibration may be the same as the one or more sensors of the sensor arrangement 110 configured to be used for non-calibration and/or different sensors of the sensor arrangement.

The detected pressure values are according to an embodiment configured to be detected by means of the pressure sensor arrangement 110 during vehicle operation. Vehicle operation may refer to normal vehicle operation, e.g. during drive of the vehicle. The detected pressure values may also be referred to as the measured pressure values.

The control device 100 is according to an embodiment configured to normalize the detected pressure values in accordance with the normalization for calibration, i.e. essentially at the same desired crank angle so as to facilitate determining difference between sample points and corresponding detected and normalized pressure values.

According to an embodiment the control device 100, when determining difference values based upon difference between sample points and corresponding detected and normalized pressure values is configured to perform a subtraction between the sample points and corresponding detected and normalized pressure values and/or configured to provide a ratio of the sample points and corresponding detected and normalized pressure values.

According to an embodiment the control device 100 is configured to, prior to determining difference values, during engine operation: detect the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for engine operation.

According to an embodiment the set of operation parameters for which the control device 100, during engine operation, is configured to detect the pressure in the exhaust manifold arrangement of the internal combustion engine further comprises certain engine cylinder valve activation timings and/or certain engine cylinder valve lift rates.

Thus, if the engine according to the present disclosure is an engine with intake valves and exhaust valves with variable valve times, the set of operation parameters for which the control device 100 is configured to detect the pressure in the exhaust manifold arrangement of the internal combustion engine further comprises certain engine cylinder valve activation timings.

Thus, if the engine according to the present disclosure is an engine with intake valves and exhaust valves with variable valve lifts the set of operation parameters for which the control device 100 is configured to detect the pressure in the exhaust manifold arrangement of the internal combustion engine further comprises certain engine cylinder valve lift rates.

The control device 100 is then configured to normalize the pressure for the created pressure sample value pattern at the desired crank angle so as to provide the detected and normalized pressure values for the determination of difference values.

The control device 100 is according to an embodiment configured to create a template course for the created pressure sample value pattern, the comprising a set of pressure values. The created pressure sample value pattern is normalized at essentially the same desired crank angle as the normalized pressure for the created stored template courses for calibration.

The control device 100 is configured to, during engine operation, e.g. during vehicle operation, create such pressure sample value patterns for each cylinder based on thus detected pressure in the exhaust manifold arrangement for a certain range of crank angles for different engine loads and different engine speeds.

The control device 100 if thus configured to, during, create a template course for the thus created pressure sample value patterns, said template course comprising a set of sample points. The control device 100 if according to an embodiment configured to create template courses for the thus created pressure sample value patterns during engine operation, e.g. during vehicle operation, comprising a set of sample pressure values for engine operation.

Each created template course is according to an embodiment based on average values of the pressure sample value pattern from which it was created. The control device 100 is according to an embodiment configured to calculate the average values of the thus created pressure sample value patterns. The control device 100 is according to an embodiment configured to calculate the average values of the thus created pressure sample value patterns for the certain range of crank angles. The set of pressure values for engine operation of the template course correspond to the thus determined average values at certain crank angles of the certain range of crank angles.

According to an embodiment the control device 100 is configured to square the thus determined difference values.

Figure 7:
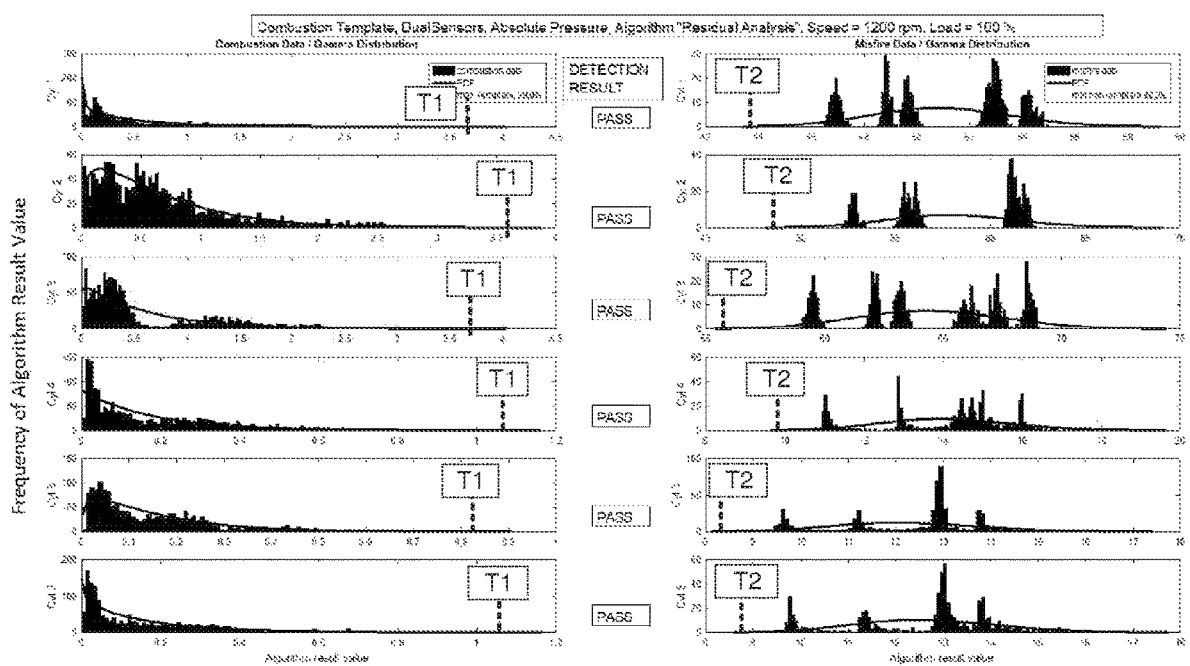
FIG. 7 schematically illustrates a graphs of results of determined reliability regarding misfire determination of cylinders of an internal combustion engine according to an embodiment of the present disclosure.

The control device 100 is further configured to summarize the thus determined difference values so as to determine whether a predetermined share of the summarized difference values lies above or below a predetermined threshold value so as to determine reliability regarding misfire determination. The difference values are according to an embodiment, where a subtraction between the sample points and corresponding detected and normalized pressure values has been performed, residual values. FIG. 7 schematically illustrates an example of such determined reliability regarding misfire determination for different cylinders for a certain engine load and engine speed.

The control device 100 is according to an embodiment configured to perform the summarizing of the thus determined difference values, here residual values, by means of a residual analysis utilizing the following formula:

$$z = \Sigma_{N1k}^{N2}(x[k]-t[k])^2$$

Here N1 refers to the desired start of the range of crank angles and N2 refers to the desired end of the range of crank angles.

Further, x[k] refers to a detected pressure value at a certain crank angle and t[k] refers to a sample point at the corresponding crank angle.

According to an embodiment of the invention, the control device 100 is, via a link 110a, operably connected to the pressure sensor arrangement 110. According to an embodiment of the invention, the control device 100 is via the link 110a arranged to receive signals from the pressure sensor arrangement 110 representing data about pressure in the exhaust manifold arrangement of the internal combustion engine.

According to an embodiment of the invention, the control device 100 is via the link 110a arranged to receive signals from the pressure sensor arrangement 110 representing data about pressure in the exhaust manifold arrangement of the internal combustion engine for a certain range of crank angles for each cylinder of the internal combustion engine for certain engine loads and certain engine speeds during combustion conditions.

The control device 100 is configured to process the data about pressure in the exhaust manifold arrangement during combustion conditions to create pressure sample value patterns for combustion conditions for the certain range of crank angles for each cylinder of the internal combustion engine for certain engine loads and certain engine speeds. The control device 100 is further, as described above configured to create template courses for the thus created pressure sample value patterns for combustion conditions and normalize the pressure for the created template courses at a desired crank angle.

According to an embodiment of the invention, the control device 100 is via the link 110a arranged to receive signals from the pressure sensor arrangement 110 representing data about pressure in the exhaust manifold arrangement of the internal combustion engine for a certain range of crank angles for each cylinder of the internal combustion engine for certain engine loads and certain engine speeds during misfire conditions.

The control device 100 is configured to process the data about pressure in the exhaust manifold arrangement during misfire conditions to create pressure sample value patterns for combustion conditions for the certain range of crank angles for each cylinder of the internal combustion engine for certain engine loads and certain engine speeds. The control device 100 is further, as described above configured to create template courses for the thus created pressure sample value patterns for misfire conditions and normalize the pressure for the created template courses at the desired crank angle.

According to an embodiment of the invention, the control device 100 is, via a link 120a, operably connected to the storage device 120. According to an embodiment of the invention, the control device 100 is via the link 120*a* arranged to send signals to the storage device 120 representing data about the normalized created template courses for combustion conditions and misfire conditions.

According to an embodiment of the invention, the control device 100 is, via a link 110*b*, operably connected to the pressure sensor arrangement 110. According to an embodiment of the invention, the control device 100 is via the link 110*b* arranged to receive signals from the pressure sensor arrangement 110 representing data about pressure in the exhaust manifold arrangement of the internal combustion engine comprising data about detected pressure values for a certain range of crank angles for certain vehicle loads and certain vehicle speeds. The control device 100 is arranged to receive the signals from the pressure sensor arrangement 110 representing data about pressure in the exhaust manifold arrangement of the internal combustion engine during vehicle operation. The link 110*b* may be the same link as the link 110*a* or a different link.

According to an embodiment of the invention, the control device 100 is, via a link 120*b*, operably connected to the storage device 120. According to an embodiment of the invention, the control device 100 is via the link 120*b* arranged to receive signals from the storage device 120 representing data about template courses comprising data about sample points for the certain range of crank angles of the template courses.

The control device 100 is configured to process the data about detected pressure values for a certain range of crank angles for certain vehicle loads and certain vehicle speeds and data about sample points for the certain range of crank angles of the template courses so as to determine difference values based upon difference between sample points and corresponding detected pressure values within in a desired range of crank angles.

The control device 100 is thus configured to determine whether there has been a misfire in a cylinder during a certain speed and a certain load and if so if the determined misfire was reliable.

The control device 100 is configured to, if it is determined, based upon summarizing the thus determined difference values, that, at a certain engine speed, misfire has been determined without reliability, provide a gear shift so as to decrease the engine speed for providing a new reliability determination with regard to misfire.

The control device 100 is according to an embodiment operably connectable to the gear shift transmission device 130 of the vehicle. The gear shift transmission device may be any suitable gear box or the like that facilitates automatic gear shift.

According to an embodiment of the invention, the control device 100 is, via a link 130*a*, operably connected to the gear shift transmission device 130. According to an embodiment of the invention, the control device 100 is via the link 130*a* arranged to send signals to the gear shift transmission device 130 representing data about decreasing the engine speed for providing a new reliability determination with regard to misfire if it has been determined that a determined misfire at a certain speed and certain load has been determined without reliability.

For an engine provided with a waste gate, e.g. a waste gate 62 as described with reference to FIG. 3, and/or an exhaust gas brake, e.g. an exhaust gas brake V3 as described with reference to FIG. 3, the control device 100 may be configured to consider the operation of the waste gate and/or the exhaust gas brake when creating pressure sample value patterns for combustion conditions and pressure sample value patterns for misfire conditions, and thus when creating template courses for those pressure sample value patterns and normalizing the created template courses at a desired crank angle and storing the normalized template courses. According to an embodiment separate template courses are created if the waste gate 62 has been activated to allow exhaust gas to bypass the turbine and/or if the exhaust gas brake V3 has been activated to provide an exhaust back pressure. See FIG. 3.

For an engine provided with a waste gate 62, the control device 100 is configured to determine whether the operational status of the waste gate 62 is such that it is activated to allow exhaust gas to bypass the turbine. For an engine provided with an exhaust gas brake V3, the control device 100 is configured to determine whether the operational status of the exhaust gas brake V3 is such that it is activated to provide an exhaust back pressure.

According to an embodiment of the invention, the control device 100 is, via a link 62*a*, operably connected to the waste gate 62. According to an embodiment of the invention, the control device 100 is via the link 62*a* arranged to receive a signal from the waste gate 62 representing data about operational status of the waste gate 62, i.e. whether it is activated to allow exhaust gas to bypass the turbine.

According to an embodiment of the invention, the control device 100 is, via a link V3*a*, operably connected to the exhaust gas brake V3. According to an embodiment of the invention, the control device 100 is via the link V3*a* arranged to receive a signal from the exhaust gas brake V3 representing data about operational status of the exhaust gas brake V3, i.e. whether it is activated to provide an exhaust back pressure.

Figure 5:
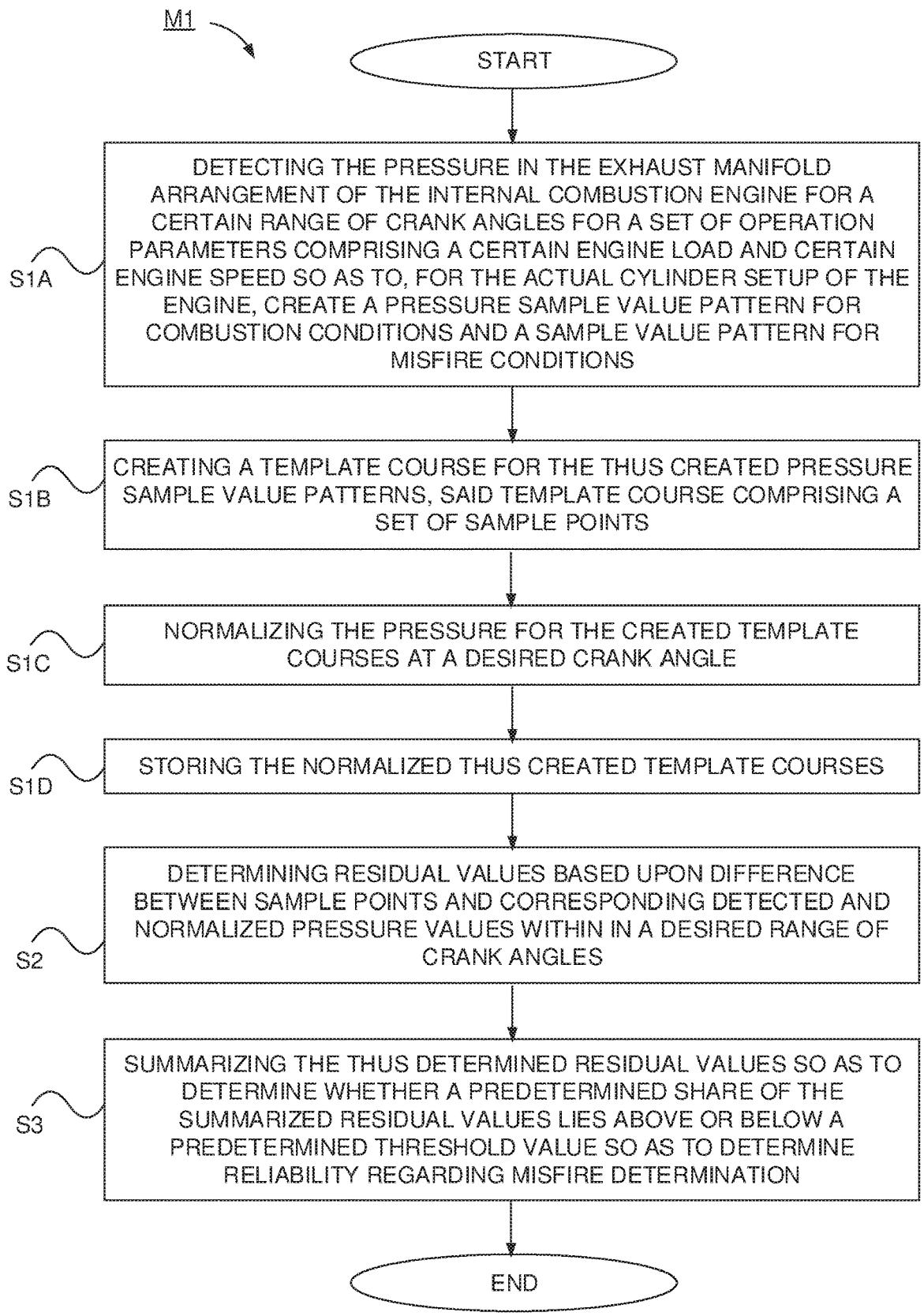
FIG. 5 schematically illustrates a flowchart of a method performed by a control device for determining reliability regarding misfire determination of cylinders of an internal combustion engine according to an embodiment of the present disclosure.

FIG. 5 schematically illustrates a flowchart of a method M1 performed by a control device for determining reliability regarding misfire determination of cylinders of an internal combustion engine according to an embodiment of the present disclosure.

According to the embodiment the method performed by a control device for determining reliability regarding misfire determination of cylinders of an internal combustion engine comprises a step S1A. In this step the pressure in the exhaust manifold arrangement of the internal combustion engine is detected for a set of operation parameters comprising a certain range of crank angles for a certain engine load and certain engine speed so as to, for the actual cylinder setup of the engine, create a pressure sample value pattern for combustion conditions and a sample value pattern for misfire conditions. According to an embodiment the exhaust manifold arrangement of the internal combustion engine is detected by means of a pressure sensor arrangement, e.g. a pressure sensor arrangement 110 as described with reference to FIG. 4.

According to the embodiment the method comprises a step S1B. In this step a template course for the thus created pressure sample value patterns is created, said template course comprising a set of sample points. Thus, in this step a template course for the thus created pressure sample value pattern for combustion is created and a template course the thus created pressure sample value pattern for misfire is created. The template course for combustion comprises a set of sample points for combustion. The template course for misfire comprises a set of sample points for misfire.

According to the embodiment the method comprises a step S1C. In this step the pressure for the created template courses is normalized at a desired crank angle. Thus, the pressure for the created template course for combustion and the pressure for the created template course for misfire is normalized at a desired crank angle.

According to the embodiment the method comprises a step S1D. In this step normalized thus created template courses are stored. According to an embodiment the normalized thus created template courses are stored in a storage device, e.g. a storage device 120 as described with reference to FIG. 4. The step S1D of storing normalized thus created template courses comprises storing template courses for combustion and/or template courses for misfire.

According to an embodiment of the method M1 steps S1A-S1D are for calibration.

According to the embodiment the method comprises a step S2. In this step difference values are determined based upon difference between sample points and corresponding detected and normalized pressure values within in a desired range of crank angles.

According to the embodiment the method comprises a step S3. In this step the thus determined difference values are summarized so as to determine whether a predetermined share of the summarized difference values lies above or below a predetermined threshold value so as to determine reliability regarding misfire determination.

According to an embodiment of the method M1 steps S2-S3 are for non-calibration. According to an embodiment of the method M1 steps S2-S3 are intended to performed during vehicle operation.

According to an embodiment of the method the thus created template course is based on average values of the thus created pressure sample value patterns. According to an embodiment the method comprises the step of, prior to creating the template courses, determining average values of the thus created sample value patterns.

According to an embodiment of the method the step of normalizing the pressure for the created template courses at a desired crank angle comprises the step of choosing a crank angle associated with a low derivative of a template course.

According to an embodiment of the method the step of normalizing the pressure for the created template courses at a desired crank angle comprises the step of choosing a crank angle resulting in a satisfactory divergence of those template courses from that crank angle.

According to an embodiment the method comprises the steps of, prior to determining difference values, during engine operation: detecting the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for engine operation; and normalizing the pressure for the created pressure sample value pattern at the desired crank angle so as to provide the detected and normalized pressure values for the determination of difference values. The method comprises according to an embodiment the step of determining the average value of the created pressure value pattern. The method comprises according to an embodiment the step of creating a template course comprising a set of pressure values. The created pressure sample value pattern is normalized at essentially the same desired crank angle as the normalized pressure for the created stored template courses for calibration.

According to an embodiment of the method the step of determining difference values based upon difference between sample points and corresponding detected and normalized pressure values comprises performing a subtraction between the sample points and corresponding pressure values and/or providing a ratio of the sample points and corresponding pressure values.

According to an embodiment the method comprises the step of, prior to summarizing the thus determined difference values, squaring the thus determined difference values.

According to an embodiment of the method the step of determining difference values based upon difference between sample points and corresponding detected pressure values comprises the step of performing the determination within a range of crank angles where the template courses have diverged to a certain extent.

According to an embodiment of the method the set of operation parameters for which the step of detecting the pressure in the exhaust manifold arrangement of the internal combustion engine is performed further comprises certain engine cylinder valve activation timings and/or certain engine cylinder valve lift rates. This is valid both for calibration and non-calibration, i.e. during engine operation, e.g. during vehicle operation.

Thus, if the engine according to the present disclosure is an engine with intake valves and exhaust valves with variable valve times, the set of operation parameters for which the control device 100 is configured to detect the pressure in the exhaust manifold arrangement of the internal combustion engine further comprises certain engine cylinder valve activation timings.

Thus, if the engine according to the present disclosure is an engine with intake valves and exhaust valves with variable valve lifts the set of operation parameters for which the control device 100 is configured to detect the pressure in the exhaust manifold arrangement of the internal combustion engine further comprises certain engine cylinder valve lift rates.

According to an embodiment the method comprises the step of, if it is determined, based upon summarizing the thus determined difference values, that, at a certain engine speed, misfire has been determined without reliability, providing a gear shift so as to decrease the engine speed for providing a new reliability determination with regard to misfire.

The method M1 performed by a control device for determining reliability regarding misfire determination of cylinders of an internal combustion engine may be performed by the control device 100 described above with reference to FIG. 4.

FIG. 6a schematically illustrates a graph of sample value patterns for combustion conditions and misfire conditions for a certain range of crank angles for a certain engine load and certain engine speed according to an embodiment of the present disclosure.

The example in FIG. 6a is for cylinder number one of a six cylinder engine, e.g. in accordance with a six cylinder engine as described with reference to FIGS. 2 and 3. The example in FIG. 6a is for an engine speed of 1200 rpm and an engine load of 100%. The certain range of crank angles is from −80 crank angle degrees to −10 crank angle degrees.

FIG. 6a illustrates sample value patterns for combustion conditions and misfire conditions for absolute pressure values.

The thus created sample value patterns for combustion conditions and misfire conditions for the certain range of crank angles for the certain engine load and certain engine speed has been created based on detected pressure values in the exhaust manifold arrangement of the internal combustion engine by means of a pressure sensor arrangement, e.g. a pressure sensor arrangement as described with reference to FIG. 3 and FIG. 4.

The sample value pattern for combustion conditions is denoted "Pattern combustion" in FIG. 6a and the sample value pattern for misfire condition is denoted "Pattern Misfire" in FIG. 6a.

A template course for the thus created pressure sample value pattern for combustion conditions, the template course comprising a set of sample points, has been created. The template course with the set of sample points for combustion being denoted "Template Combustion" in FIG. 6a and having ring shapes.

The thus created template course for combustion conditions is based on average values of the thus created pressure sample value patterns for combustion conditions.

Further, a template course for the thus created pressure sample value pattern for misfire conditions, the template course comprising a set of sample points, has been created. The template course with the set of sample points for misfire being denoted "Template Misfire" in FIG. 6a and having squared shapes.

The thus created template course for misfire conditions is based on average values of the thus created pressure sample value patterns for misfire conditions.

FIG. 6b schematically illustrates a graph of the sample value patterns in FIG. 6a where the pressure for template courses for the sample value patterns has been normalized at a desired crank angle degree according to an embodiment of the present disclosure.

As can be seen in FIG. 6b the pressure for the created template course for combustion and the template course for misfire have been normalized at a crank angle of about −56 degrees.

The crank angle at which the template courses for the sample value patterns have been normalized with regard to pressure has been chosen at a crank angle associated with a low derivative of a template course. As can be seen in FIG. 6a the derivative of the template course for combustion is relative low at the crank angle of −56 degrees.

The crank angle at which the template courses for the sample value patterns have been normalized with regard to pressure has further been chosen at a crank angle which results in a in a satisfactory divergence of those template courses from that crank angle. As can be seen in FIG. 6b the thus normalized template courses for the sample value patterns diverge significantly from the crank angle of −56 degrees.

The thus created normalized template courses are stored in a storage device, e.g. a storage device in accordance with the storage device described with reference to FIG. 4.

According to an, when determining difference values based upon difference between sample points and corresponding detected pressure values, as described above e.g. with reference to FIG. 4, the determination is configured to be performed within a range of crank angles where the template courses have diverged to a certain extent. In the example in FIG. 6b such a range of crank angles could e.g. be from −30 degrees to −20 degrees.

FIG. 7 schematically illustrates a graphs of results of determined reliability regarding misfire determination of cylinders of an internal combustion engine according to an embodiment of the present disclosure.

In FIG. 7 difference values in the form of residual values determined based upon difference between sample points and corresponding detected pressure values within in a desired range of crank angles and squared have been summarized so as to determine whether a predetermined share of the summarized residual values lies above or below a predetermined threshold value T1, T2 so as to determine reliability regarding misfire determination.

In the example in FIG. 7 this has been done for all six cylinders at an engine speed of 1200 rpm and an engine load of 100%, i.e. as in fig.

The summarizing of the thus determined difference values has been performed by means of a residual analysis utilizing the formula described with reference to FIG. 4, i.e.:

$$z = \Sigma_{N1}^{N2}(x[k]-t[k])^2 \qquad \text{a.}$$

where N1 refers to the desired start crank angle of the range of crank angles and N2 refers the desired end crank angle of the desired range of crank angles, and x[k] refers to a detected pressure value at a certain crank angle and t[k] refers to a sample point at the corresponding crank angle When using template from combustion data, T1 is the value where 99.9% of the combustion measurements are expected to have lower value than T1 and T2 is the value where 99.9% of the misfire measurements are expected to have higher value than T2. If T2>T1 then any value in between T1 and T2 can serve as a final threshold value, and a measurement value higher than the threshold is classified as misfire, while a measurement with lower value than threshold is classified as combustion. WhenT1<final threshold value<T2 the detection is robust, while if T1>T2 then detection is not robust.

The left graphs illustrate the result for combustion for the respective cylinder and the right graphs illustrate the result for misfire for the respective cylinder. In order to pass with regard to reliability regarding misfire determination the threshold value of the thus squared and summarized difference values need to be within 99.9% of a certain value for the respective cylinder.

For the stored template course for combustion for cylinder 1 the threshold value is about 3.6, and more than 99.9% of all summarized squared difference values lie below this value and thus there is a reliability in the determination with regard to misfire.

For the stored template course for misfire for cylinder 1 the threshold value is about 43.8, and more than 99.9% of all summarized squared difference values lie above this value and thus there is a reliability in the determination with regard to misfire.

Figure 8:
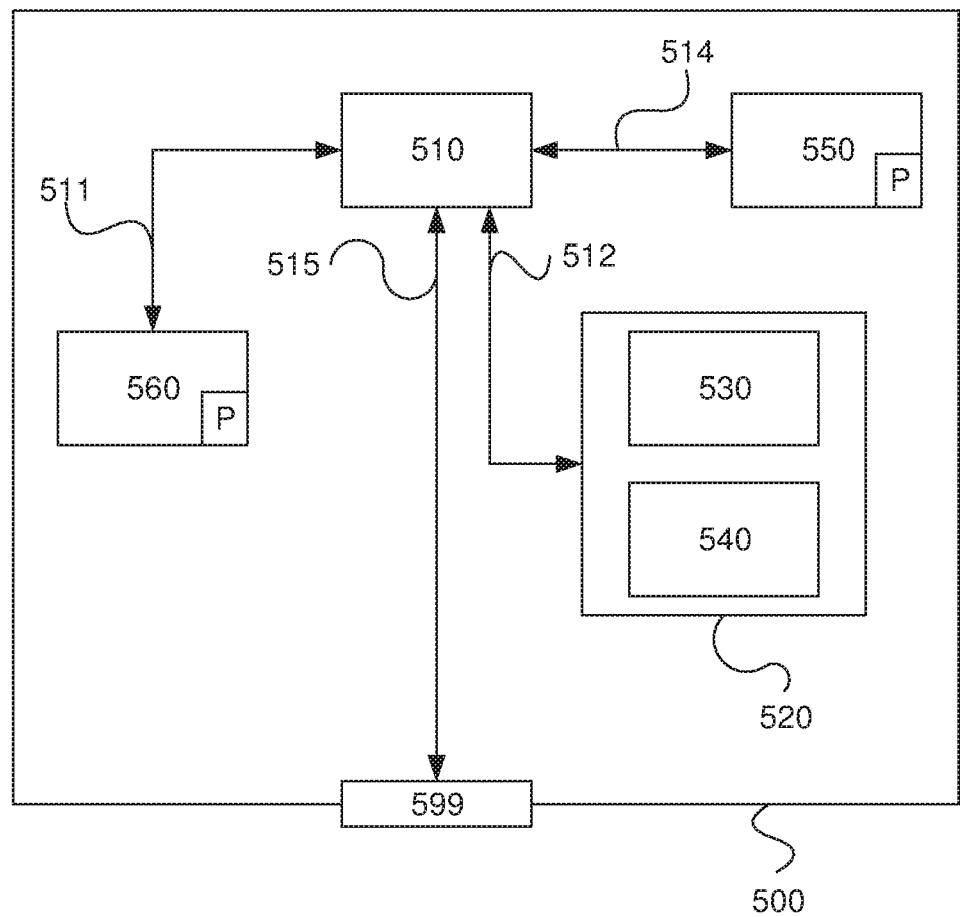
FIG. 8 schematically illustrates a computer according to an embodiment of the present invention.

With reference to FIG. 8, a diagram of a computer 500/apparatus 500 is shown. The control device 100 described with reference to FIG. 4 may according to an embodiment comprise apparatus 500. Apparatus 500 comprises a non-volatile memory 520, a data processing device 510 and a read/write memory 550. Non-volatile memory 520 has a first memory portion 530 wherein a computer program, such as an operating system, is stored for controlling the function of apparatus 500. Further, apparatus 500 comprises a bus controller, a serial communication port, I/O-means, an A/D-converter, a time date entry and transmission unit, an event counter and an interrupt controller (not shown). Non-volatile memory 520 also has a second memory portion 540.

A computer program P is provided comprising routines for determining reliability regarding misfire determination of cylinders of an internal combustion engine.

The program P comprises routines for detecting the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for combustion conditions and a sample value pattern for misfire conditions. The program P comprises routines for creating a template course for the thus created pressure sample value patterns, said template course comprising a set of sample points. The program P comprises routines for normalizing the pressure for the created template courses at a desired crank angle; storing normalized thus created template courses. The program P comprises routines for determining difference values based upon difference between sample points and corresponding detected and normalized pressure values within in a desired range of crank angles. The program P comprises routines for summarizing the thus determined difference values so as to determine whether a predetermined share of the summarized difference values lies above or below a predetermined threshold value so as to determine reliability regarding misfire determination.

The thus created template course is based on average values of the thus created pressure sample value patterns.

The routines for normalizing the pressure for the created template courses at a desired crank angle comprises routines for choosing a crank angle associated with a low derivative of a template course.

The routines for normalizing the pressure for the created template courses at a desired crank angle comprises routines for choosing a crank angle resulting in a satisfactory divergence of those template courses from that crank angle.

The program P may comprise routines for, prior to determining difference values, during engine operation, detecting the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for engine operation.

The program P may comprise routines for, prior to determining difference values, during engine operation, normalizing the pressure for the created pressure sample value pattern at the desired crank angle so as to provide the detected and normalized pressure values for the determination of difference values.

The routines for determining difference values based upon difference between sample points and corresponding detected and normalized pressure values comprises routines for performing a subtraction between the sample points and corresponding pressure values and/or routines for providing a ratio of the sample points and corresponding pressure values.

The program P comprises routines for, prior to summarizing the thus determined difference values, squaring the thus determined difference values.

The routines for determining difference values based upon difference between sample points and corresponding detected pressure values comprises routines for performing the determination within a range of crank angles where the template courses have diverged to a certain extent.

The program P comprises routines for, if it is determined, based upon summarizing the thus determined difference values, that, at a certain engine speed, misfire has been determined without reliability, providing a gear shift so as to decrease the engine speed for providing a new reliability determination with regard to misfire.

The computer program P may be stored in an executable manner or in a compressed condition in a separate memory 560 and/or in read/write memory 550.

When it is stated that data processing device 510 performs a certain function it should be understood that data processing device 510 performs a certain part of the program which is stored in separate memory 560, or a certain part of the program which is stored in read/write memory 550.

Data processing device 510 may communicate with a data communications port 599 by means of a data bus 515. Non-volatile memory 520 is adapted for communication with data processing device 510 via a data bus 512. Separate memory 560 is adapted for communication with data processing device 510 via a data bus 511. Read/write memory 550 is adapted for communication with data processing device 510 via a data bus 514. To the data communications port 599 e.g. the links connected to the control unit 100 may be connected.

When data is received on data port 599 it is temporarily stored in second memory portion 540. When the received input data has been temporarily stored, data processing device 510 is set up to perform execution of code in a manner described above. The signals received on data port 599 may be used by apparatus 500 for detecting the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for combustion conditions and a sample value pattern for misfire conditions. The signals received on data port 599 may be used by apparatus 500 for creating a template course for the thus created pressure sample value patterns, said template course comprising a set of sample points. The signals received on data port 599 may be used by apparatus 500 for normalizing the pressure for the created template courses at a desired crank angle; storing normalized thus created template courses. The signals received on data port 599 may be used by apparatus 500 for determining difference values based upon difference between sample points and corresponding detected and normalized pressure values within in a desired range of crank angles. The signals received on data port 599 may be used by apparatus 500 for summarizing the thus determined difference values so as to determine whether a predetermined share of the summarized difference values lies above or below a predetermined threshold value so as to determine reliability regarding misfire determination.

The thus created template course is based on average values of the thus created pressure sample value patterns.

The signals used for normalizing the pressure for the created template courses at a desired crank angle comprises signals used for choosing a crank angle associated with a low derivative of a template course.

The signals used for normalizing the pressure for the created template courses at a desired crank angle comprises signals used for choosing a crank angle resulting in a satisfactory divergence of those template courses from that crank angle.

The signals received on data port 599 may be used by apparatus 500 for, prior to determining difference values, during engine operation, detecting the pressure in the exhaust manifold arrangement of the internal combustion engine for a set of operation parameters comprising a certain range of crank angles for a certain engine load and certain engine speed so as to, for the actual cylinder setup of the engine, create a pressure sample value pattern for engine operation.

The signals received on data port 599 may be used by apparatus 500 for, prior to determining difference values, during engine operation, normalizing the pressure for the created pressure sample value pattern at the desired crank angle so as to provide the detected and normalized pressure values for the determination of difference values.

The signals used for determining difference values based upon difference between sample points and corresponding detected and normalized pressure values comprises signals used for performing a subtraction between the sample points and corresponding pressure values and/or signals used for providing a ratio of the sample points and corresponding pressure values.

The signals received on data port 599 may be used by apparatus 500 for, prior to summarizing the thus determined difference values, squaring the thus determined difference values.

The signals used for determining difference values based upon difference between sample points and corresponding detected pressure values comprises signals used for performing the determination within a range of crank angles where the template courses have diverged to a certain extent.

The signals received on data port 599 may be used by apparatus 500 for, if it is determined, based upon summarizing the thus determined difference values, that, at a certain engine speed, misfire has been determined without reliability, providing a gear shift so as to decrease the engine speed for providing a new reliability determination with regard to misfire.

Parts of the methods described herein may be performed by apparatus 500 by means of data processing device 510 running the program stored in separate memory 560 or read/write memory 550. When apparatus 500 runs the program, parts of the methods described herein are executed.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method performed by a control device for determining reliability regarding misfire determination of cylinders of an internal combustion engine, the method comprising steps of, for calibration:
    detecting a pressure in an exhaust manifold arrangement of the internal combustion engine for a set of operation parameters comprising a certain range of crank angles for a certain engine load and certain engine speed so as to, for an actual cylinder setup of the internal combustion engine, create a pressure sample value pattern for combustion conditions and a pressure sample value pattern for misfire conditions;
    creating a template course for each of the thus created pressure sample value patterns, each of said template courses comprising a set of sample points;
    normalizing a pressure for the created template courses at a desired crank angle;
    storing normalized thus created template courses;
    determining difference values based upon differences between sample points and corresponding detected and normalized pressure values within a desired range of crank angles; and
    summarizing the thus determined difference values so as to determine whether a predetermined share of the summarized difference values lies above or below a predetermined threshold value so as to determine reliability regarding misfire determination.

2. The method according to claim 1, wherein the thus created template courses are based on average values of the thus created pressure sample value patterns.

3. The method according to claim 1, wherein the step of normalizing the pressure for the created template courses at the desired crank angle comprises the step of choosing a crank angle associated with a low derivative of a template course.

4. The method according to claim 1, wherein the step of normalizing the pressure for the created template courses at the desired crank angle comprises the step of choosing a crank angle resulting in a satisfactory divergence of those template courses from that crank angle.

5. The method according to claim 1, comprising the steps of, prior to determining the difference values, during engine operation:
    detecting the pressure in the exhaust manifold arrangement of the internal combustion engine for the set of operation parameters comprising the certain range of crank angles for the certain engine load and certain engine speed so as to, for the actual cylinder setup of the internal combustion engine, create a pressure sample value pattern for engine operation; and
    normalizing a pressure for the created pressure sample value pattern for engine operation at the desired crank angle so as to provide the detected and normalized pressure values for the determination of the difference values.

6. The method according to claim 1, wherein the step of determining the difference values based upon the differences between the sample points and the corresponding detected and normalized pressure values comprises performing a subtraction between the sample points and the corresponding detected and normalized pressure values and/or providing a ratio of the sample points and the corresponding detected and normalized pressure values.

7. The method according to claim 1, comprising the step of, prior to summarizing the thus determined difference values, squaring the thus determined difference values.

8. The method according to claim 1, wherein the step of determining the difference values based upon the differences between the sample points and the corresponding detected and normalized pressure values comprises the step of performing the determination within a range of crank angles where the template courses have diverged to a certain extent.

9. The method according to claim 1, wherein the set of operation parameters for which the step of detecting the pressure in the exhaust manifold arrangement of the internal combustion engine is performed further comprises certain engine cylinder valve activation timings and/or certain engine cylinder valve lift rates.

10. The method according to claim 1, comprising the step of, if it is determined, based upon summarizing the thus determined difference values, that, at a certain engine speed, misfire has been determined without reliability, providing a gear shift so as to decrease the engine speed for providing a new reliability determination with regard to misfire.

11. A control device for determining reliability regarding misfire determination of cylinders of an internal combustion engine, the control device being configured to, for calibration:
    detect a pressure in an exhaust manifold arrangement of the internal combustion engine for a set of operation parameters comprising a certain range of crank angles for a certain engine load and certain engine speed so as to, for an actual cylinder setup of the internal combustion engine, create a pressure sample value pattern for combustion conditions and a pressure sample value pattern for misfire conditions;

create a template course for each of the thus created pressure sample value patterns, each of said template courses comprising a set of sample points;

normalize a pressure for the created template courses at a desired crank angle;

store normalized thus created template courses;

determine difference values based upon differences between sample points and corresponding detected and normalized pressure values within a desired range of crank angles; and summarize the thus determined difference values so as to determine whether a predetermined share of the summarized difference values lies above or below a predetermined threshold value so as to determine reliability regarding misfire determination.

12. The control device according to claim 11, wherein the thus created template courses are based on average values of the thus created pressure sample value patterns.

13. The control device according to claim 11, wherein the control device, when normalizing the pressure for the created template courses at the desired crank angle, is configured to choose a crank angle associated with a low derivative of a template course.

14. The control device according to claim 11, wherein the control device, when normalizing the pressure for the created template courses at the desired crank angle, is configured to choose a crank angle resulting in a satisfactory divergence of those template courses from that crank angle.

15. The control device according to claim 11, the control device being configured to, prior to determining the difference values, during engine operation:

detect the pressure in the exhaust manifold arrangement of the internal combustion engine for the set of operation parameters comprising the certain range of crank angles for the certain engine load and certain engine speed so as to, for the actual cylinder setup of the internal combustion engine, create a pressure sample value pattern for engine operation; and normalize a pressure for the created pressure sample value pattern for engine operation at the desired crank angle so as to provide the detected and normalized pressure values for the determination of the difference values.

16. The control device according to claim 11, wherein the control device, when determining the difference values based upon the differences between the sample points and the corresponding detected and normalized pressure values comprises performing a subtraction between the sample points and the corresponding detected and normalized pressure values and/or providing a ratio of the sample points and the corresponding detected and normalized pressure values.

17. The control device according to claim 11, the control device being configured to, prior to summarizing the thus determined difference values, square the thus determined difference values.

18. The control device according to claim 11, wherein the control device, when determining the difference values based upon the differences between the sample points and the corresponding detected and normalized pressure values, is configured to perform the determination within a range of crank angles where the template courses have diverged to a certain extent.

19. The control device according to claim 11, wherein the set of operation parameters for which the control device is configured to detect the pressure in the exhaust manifold arrangement of the internal combustion engine further comprises certain engine cylinder valve activation timings and/or certain engine cylinder valve lift rates.

20. The control device according to claim 11, the control device being configured to, if it is determined, based upon summarizing the thus determined difference values, that, at a certain engine speed, misfire has been determined without reliability, provide a gear shift so as to decrease the engine speed for providing a new reliability determination with regard to misfire.

21. A vehicle operated by an internal combustion engine, the vehicle comprising a control device for determining reliability regarding misfire determination of cylinders of the internal combustion engine, the control device being configured to, for calibration:

detect a pressure in an exhaust manifold arrangement of the internal combustion engine for a set of operation parameters comprising a certain range of crank angles for a certain engine load and certain engine speed so as to, for an actual cylinder setup of the internal combustion engine, create a pressure sample value pattern for combustion conditions and a pressure sample value pattern for misfire conditions;

create a template course for each of the thus created pressure sample value patterns, each of said template courses comprising a set of sample points;

normalize a pressure for the created template courses at a desired crank angle;

store normalized thus created template courses;

determine difference values based upon differences between sample points and corresponding detected and normalized pressure values within a desired range of crank angles; and summarize the thus determined difference values so as to determine whether a predetermined share of the summarized difference values lies above or below a predetermined threshold value so as to determine reliability regarding misfire determination.

22. A non-transitory computer-readable medium used for determining reliability regarding misfire determination of cylinders of an internal combustion engine, said non-transitory computer-readable medium storing computer program code comprising computer instructions to cause one or more control devices to perform the following operations:

detecting a pressure in an exhaust manifold arrangement of the internal combustion engine for a set of operation parameters comprising a certain range of crank angles for a certain engine load and certain engine speed so as to, for an actual cylinder setup of the internal combustion engine, create a pressure sample value pattern for combustion conditions and a pressure sample value pattern for misfire conditions;

creating a template course for each of the thus created pressure sample value patterns, each of said template courses comprising a set of sample points;

normalizing a pressure for the created template courses at a desired crank angle;

storing normalized thus created template courses;

determining difference values based upon differences between sample points and corresponding detected and normalized pressure values within a desired range of crank angles; and summarizing the thus determined difference values so as to determine whether a predetermined share of the summarized difference values lies above or below a predetermined threshold value so as to determine reliability regarding misfire determination.

\* \* \* \* \*